UNITED STATES PATENT OFFICE.

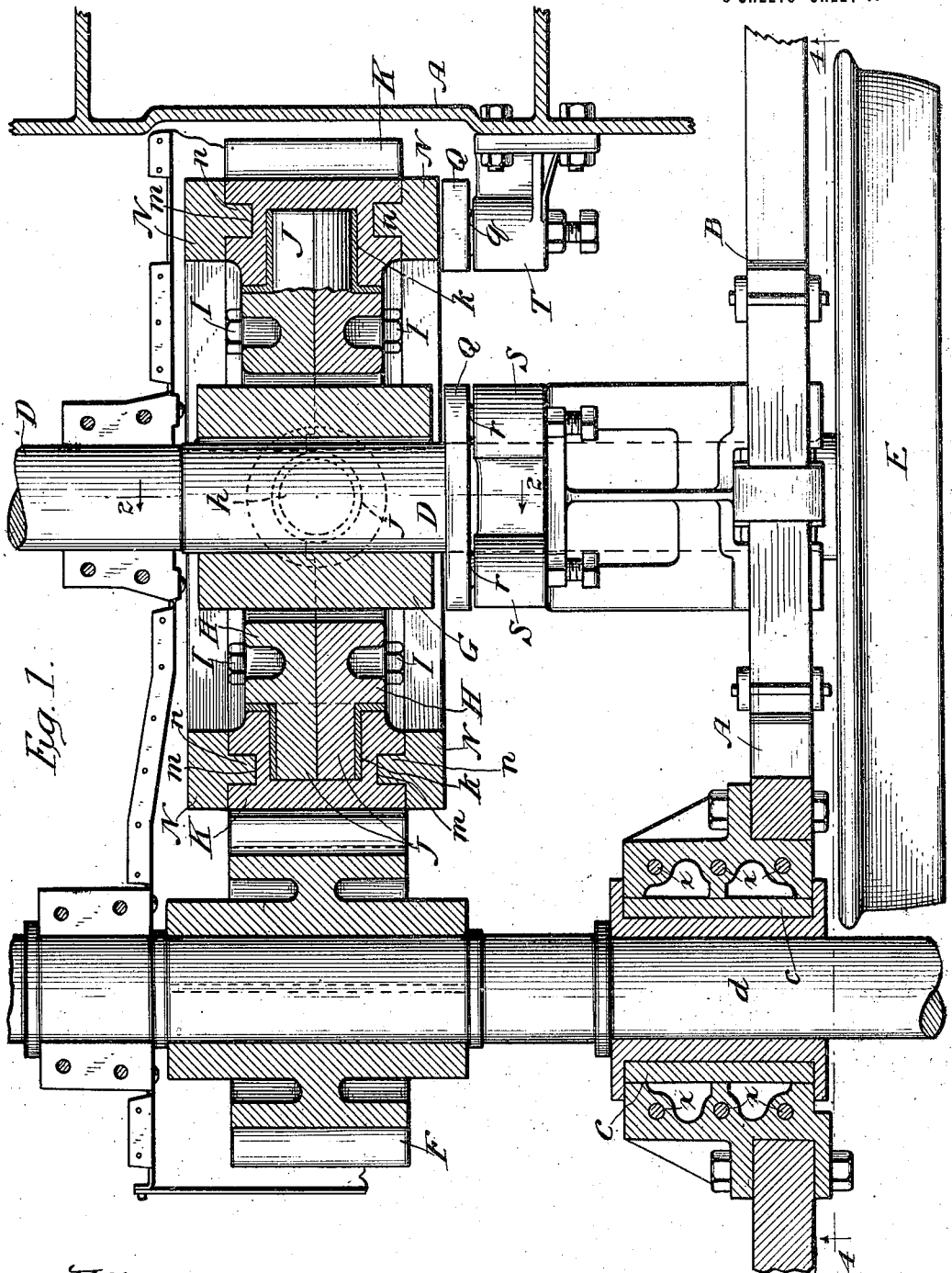

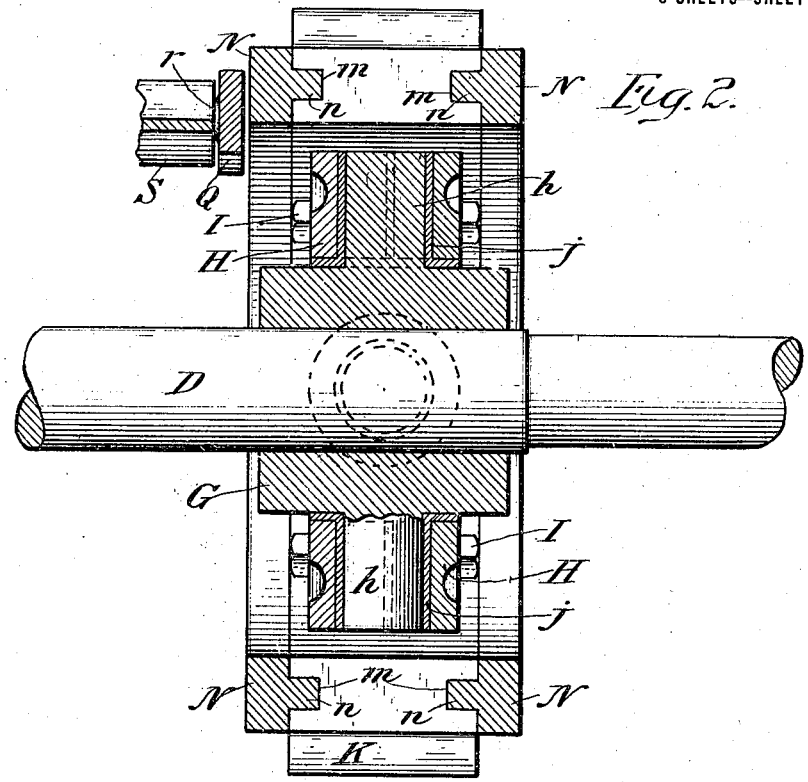
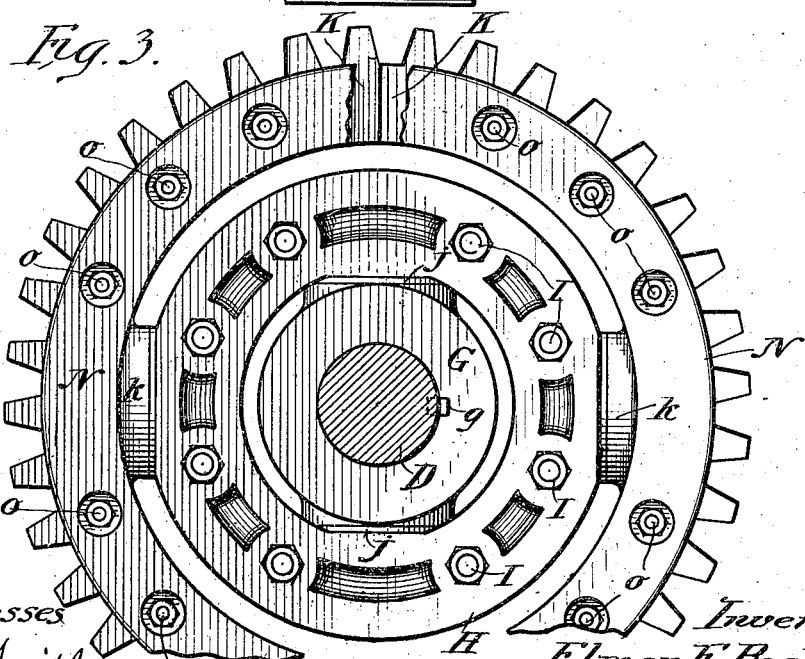

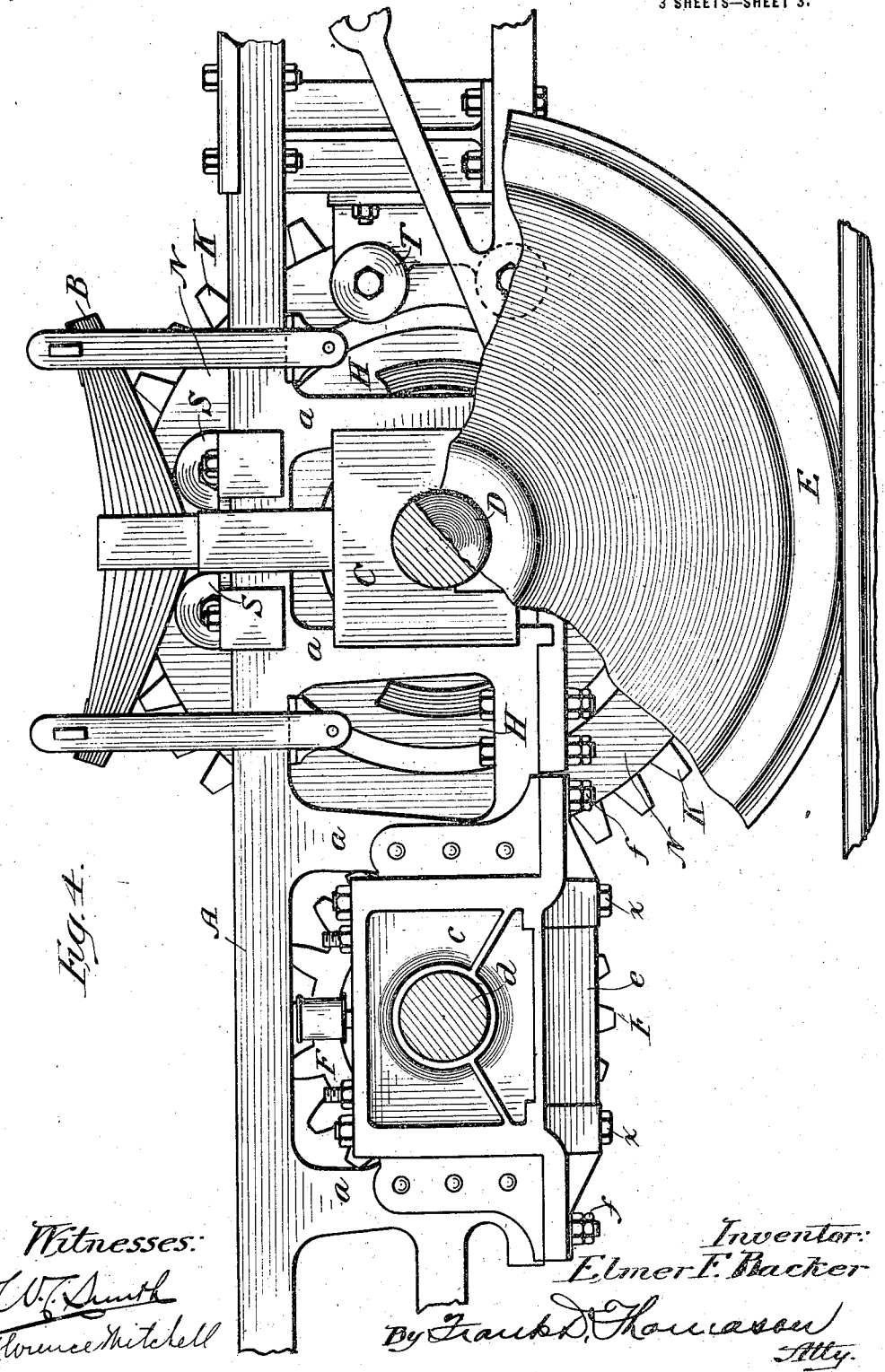

ELMER F. BACKER, OF DAVENPORT, IOWA, ASSIGNOR TO DAVENPORT LOCOMOTIVE WORKS, OF DAVENPORT, IOWA, A CORPORATION OF IOWA.

TRUCK FOR ARTICULATED GEARED LOCOMOTIVES.

1,242,308.  Specification of Letters Patent.  Patented Oct. 9, 1917.

Application filed October 28, 1916. Serial No. 128,211.

*To all whom it may concern:*

Be it known that I, ELMER F. BACKER, a citizen of the United States, residing at Davenport, in the county of Scott and State of Iowa, have invented new and useful Improvements in Trucks for Articulated Geared Locomotives, of which the following is a full, clear, and exact description.

My invention relates to the trucks of articulated geared locomotives, and particularly to gearing for connecting the axles of said trucks and the crank-shaft for transmitting motion one to the other of said axles.

The object of my invention is to provide a universal gear for the driving-axle of the truck so as to prevent the transmission of the endwise and vertical vibration of the driving-axle to the crank-shaft, thus permitting the intermeshing gears of the driven-axle and said crank-shaft to adjust themselves to one another, and permitting both axles free to vibrate endwise or vertically independently of each other without straining the truck-frame and causing the rapid deterioration thereof and the bearings of the crank-shaft.

In the drawings:

Figure 1 is a plan view of a fragmentary portion of the truck of an articulate geared locomotive to which my improvements are applied.

Fig. 2 is a vertical transverse section of the universal gear used in connection with my improvements segregated from the remainder of the truck, taken on dotted line 2—2, Fig. 1.

Fig. 3 is a side view of said universal gear with the lower segment of its rim broken away and the axle thereof in section.

Fig. 4 is a longitudinal vertical section taken on dotted line 4—4, Fig. 1.

Referring to the drawings, A represents the portion of the truck-frame of an articulated geared locomotive which is most immediately effected by my improvements, although, as will hereinafter more fully appear, said improvements will accomplish a great decrease in the transmission of shocks and concussions caused by the vibrations of the driving-wheels and axles thereof that they will benefit the frame-work of the entire truck. The side-frames B of this truck are provided with the usual pedestals $b$ for the journal-boxes C of the axle D of the drive-wheels E, and said journal-boxes are cushioned in any suitable manner to obtain the necessary resiliency of the truck.

The side-frames of the truck are also provided with immovable bearings for a crank-shaft $d$, through the medium of which motion is transmitted to the axles. As shown in the drawings, these bearings each consist of a suitable journal-box $c$, which is rigidly retained in the jaws of the pedestal by a pedestal-brace $e$, through the medium of vertical bolts $x$, and said brace is rigidly secured to the side-frames of the truck by vertical bolts $f, f$. The details of construction of the bearings of said crank-shaft, such as its braces, and wedges and oiling devices, are immaterial in so far as my invention is concerned.

The motion of the crank-shaft is imparted to the driving-axle by means of a universal-gear on the latter and a pinion F on the former. The pinion may be of any desired construction, but the universal-gear must be of such construction that its rim will be flexible and adapt itself to the varying relative positions of the axle to the shaft, as well as to the varying positions of the truck-frame.

The universal-gear comprising a hub, a toothed rim, and a floating-annulus interposed between said hub and rim. The hub G consists of a cylindrical sleeve that is mounted upon and permanently secured to the axle at about its center of length by a key $g$, or other suitable means. At points diametrically opposite each other hub G has trunnions $h, h$, and these trunnions are journaled in bearings $j, j$, in a floating-annulus consisting of two corresponding circular sections H, H, that are secured together by transverse bolts I, I, substantially as shown in the drawings. The joint separating these two sections intersects the center of bearings $j, j$, and also splits the centers of trunnions J, J, that project from diametrically opposite flattened portions of the circumference of said annulus, in such position that their axes intersect the axes of bearings $j, j$, at right angles.

In mounting the floating-annulus on the hub, the circular sections thereof are slipped over opposite ends of the axle before the wheels are mounted on the ends of the same and are then slipped over the ends of said hub until the split bearings $j, j$, surround trunnions $h$, $h$, whereupon the said sections are secured together by bolts I, I, hereinbefore referred to.

The toothed rim of said universal gear is divided into two semi-circular sections K, K, and each of said sections is provided with bearings $k$, $k$, in their inner concaved surfaces midway the ends thereof. These bearings are placed over trunnions J, and the end edges of said sections brought into contact with each other to form a perfectly circular rim the outer circumference of which is provided with teeth M that engage the teeth of pinion F, hereinbefore referred to. Sections K, K, are provided with grooves $m$, $m$, in their side edges, and said sections are secured together by means of rings N, N, that are provided with annular tongues $n$, $n$, that enter grooves $m$, $m$, and hold said sections K, K, together. These rings are secured in position by means of transverse bolts $o$, $o$, that extend through suitable transverse openings, then both the rings and the tongues thereof, and through the rim sections, and have their heads and the nuts on their opposite threaded ends countersunk.

When traveling upon rough track the driving axle has endwise play in its bearing-boxes varying from one-quarter of an inch to three-eighths of an inch, and, owing to the unevenness of the railroad tracks, said axle and the journal-boxes thereof have a limited amount of vertical movement, which is accommodated by the usual cushioning elements coöperating with said journal-boxes. The diversity of motion instead of being transmitted by direct shocks to the truck-frame through the medium of pinion F is transmitted through said universal gear, which latter accommodates itself to all of the varied positions the driving-axle may assume to the truck-frame and transmits motion to the pinion without either shock or blow.

In order, however, to steady the rim of this universal gear, I employ shoes Q and R, consisting of metal members that are mounted on the ends of suitable shanks $q$ and $r$, $r$, which latter are seated and longitudinally adjustable in metal sockets S and T. These sockets have supporting-plates that are secured in any suitable manner to the transoms or cross-bars of the truck, and the shoes carried thereby limit the side-plate to correspond to the play of the truck-frame.

What I claim as new:—

1. The combination with a truck-frame for geared locomotives, a crank-shaft, bearings therefor in the side members of said truck-frame, a driving-axle and cushioned bearings for said driving axle, of a flexible gear comprising a hub that is adapted to be securely mounted on said axle and has trunnions projecting therefrom diametrically opposite each other, an annular member having bearings in the inner circumference thereof in which said trunnions are journaled and provided with trunnions projecting from the outer circumference thereof the axes of which are at right angles to the axes of said bearings, a circular rim consisting of a plurality of sections and having teeth projecting from its outer circumference and concentric circular grooves in its side edges and provided with bearings in its inner circumference in which the trunnions of said annular member are journaled, and rings having circular tongues adapted to enter said grooves and suitably secured to the sides of said rim.

2. The combination with a truck-frame for geared locomotives, a crank-shaft, bearings therefor in the side members of said truck-frame, a driving-axle and cushioned bearings for said driving axle, of a flexible gear comprising a hub that is adapted to be securely mounted on said axle and has trunnions projecting therefrom diametrically opposite each other, an annular member split lengthwise into the annular sections and having bearings in the inner circumference thereof intersected by the joint between said sections in which said trunnions are journaled and having trunnions projecting from the outer circumference thereof whose axes are at right angles to the axes of said bearings, and a circular rim having teeth projecting from its outer circumference and provided with bearings in its inner circumference in which the trunnions of said annular member are journaled.

3. The combination with a truck-frame for geared locomotives, a crank-shaft, bearings therefor in the side members of said truck-frame, a driving-axle and cushioned bearings for said driving-axle, of a flexible gear comprising a hub that is adapted to be securely mounted on said axle and has trunnions projecting therefrom diametrically opposite each other, an annular member split lengthwise into two annular sections and having bearings in the inner circumference thereof intersected by the joint between said sections in which said trunnions are journaled and having trunnions projecting from the outer circumference thereof whose axes are at right angles to the axes of said bearings, a circular rim consisting of a plurality of sections and having teeth projecting from its outer circumference and concentric circular grooves in its side edges and provided with bearings in its inner circumference in which the trunnions of said annular member are journaled, and rings having circular tongues adapted to enter said grooves and suitably secured to the sides of said rim.

4. The combination with a truck-frame for geared locomotives, a crank-shaft, bearings therefor secured to said frame, and a small gear mounted on said shaft, of a driving-axle having limited side thrust, cushioned bearings for said driving-axle, a gear mounted on said axle the toothed rim of which has a limited lateral movement oblique to the right angular plane intersecting its axis, and a shoe for limiting the lateral movement of said rim.

5. The combination with a truck-frame for geared locomotives, a crank-shaft, bearings therefor immovably secured to said frame, and a small gear mounted on said shaft, of a driving-axle having a limited side thrust, cushioned bearings for said driving-axle, a gear comprising a hub rigidly secured to said axle, a toothed rim and a floating annular member pivotally connected to and interposed between said hub and rim, and a shoe for limiting the lateral movement of said rim.

6. The combination with a truck-frame for geared locomotives, a crank-shaft, bearings therefor immovably secured to said frame, and a small gear mounted on said shaft, of a driving-axle having a limited side thrust, cushioned bearings for said driving-axle, a gear comprising a hub rigidly secured to said axle, a toothed rim and a floating annular member pivotally connected to and interposed between said hub and rim, and a plurality of shoes for limiting the lateral movement of said rim.

7. The combination with a truck-frame for geared locomotives, a crank-shaft, bearings therefor secured to said frame, and a small gear mounted on said shaft, of a driving-axle having limited side thrust, cushioned bearings for said driving-axle, a gear mounted on said axle the toothed rim of which has a limited lateral movement oblique to the right angular plane intersecting its axis, and an adjustable shoe for limiting the lateral movement of said rim.

In witness whereof I have hereunto set my hand this 19 day of October, 1916.

ELMER F. BACKER.

Witnesses:
C. H. ALLAN,
VICTOR F. LUCHT.

Copies of this patent may be obtained for five cents each, by addressing the "Commissioner of Patents, Washington, D. C."